(12) United States Patent
Morgan et al.

(10) Patent No.: US 7,681,046 B1
(45) Date of Patent: Mar. 16, 2010

(54) SYSTEM WITH SECURE CRYPTOGRAPHIC CAPABILITIES USING A HARDWARE SPECIFIC DIGITAL SECRET

(76) Inventors: Andrew Morgan, P.O. Box 633, Redwood Estates, CA (US) 95044; H. Peter Anvin, 2690 Ohlone Dr., San Jose, CA (US) 95132-2632

( * ) Notice: Subject to any disclaimer, the term of this patent is extended or adjusted under 35 U.S.C. 154(b) by 989 days.

(21) Appl. No.: 10/672,796

(22) Filed: Sep. 26, 2003

(51) Int. Cl.
*G06F 12/14* (2006.01)

(52) U.S. Cl. ............................ 713/193; 713/189; 712/24

(58) Field of Classification Search .......... 713/192–194
See application file for complete search history.

(56) References Cited

U.S. PATENT DOCUMENTS

| | | | |
|---|---|---|---|
| 4,486,827 A | 12/1984 | Shima et al. | |
| 4,634,807 A * | 1/1987 | Chorley et al. | ............... 705/55 |
| 4,674,089 A | 6/1987 | Poret et al. | |
| 4,928,224 A | 5/1990 | Zulian | |
| 4,941,176 A | 7/1990 | Matyas et al. | |
| 5,034,980 A | 7/1991 | Kubota | ........................ 380/4 |
| 5,081,675 A | 1/1992 | Kittirutsunetorn | |
| 5,305,244 A | 4/1994 | Newman et al. | |
| 5,343,524 A | 8/1994 | Mu et al. | ....................... 380/4 |
| 5,463,535 A | 10/1995 | Vest | |
| 5,475,829 A | 12/1995 | Thome | |
| 5,511,123 A | 4/1996 | Adams | |
| 5,511,206 A | 4/1996 | Yasuda et al. | |
| 5,530,753 A | 6/1996 | Easter et al. | ................... 380/4 |
| 5,563,950 A * | 10/1996 | Easter et al. | ............... 713/191 |
| 5,596,741 A | 1/1997 | Thome | |
| 5,623,637 A | 4/1997 | Jones et al. | |
| 5,696,823 A * | 12/1997 | Blaze | ........................ 380/279 |
| 5,748,744 A | 5/1998 | Levy et al. | |
| 5,774,544 A | 6/1998 | Lee et al. | ....................... 380/4 |
| 5,835,594 A | 11/1998 | Albrecht et al. | |
| 5,878,210 A | 3/1999 | Kong | |
| 5,896,522 A | 4/1999 | Ward et al. | |
| 5,933,497 A | 8/1999 | Beetcher et al. | ............... 380/4 |
| 5,991,399 A | 11/1999 | Graunke et al. | |
| 6,011,908 A | 1/2000 | Wing et al. | |
| 6,023,506 A | 2/2000 | Ote et al. | ........................ 380/4 |
| 6,031,992 A | 2/2000 | Cmelik et al. | |
| 6,038,320 A | 3/2000 | Miller | |
| 6,044,157 A | 3/2000 | Uesaka et al. | |
| 6,061,449 A | 5/2000 | Candelore et al. | |
| 6,145,051 A | 11/2000 | Estakhri et al. | |
| 6,172,990 B1 | 1/2001 | Deb et al. | |
| 6,175,896 B1 | 1/2001 | Bui | |
| 6,199,152 B1 | 3/2001 | Kelly et al. | |
| 6,199,153 B1 | 3/2001 | Razdan et al. | |
| 6,249,782 B1 | 6/2001 | Day et al. | |

(Continued)

FOREIGN PATENT DOCUMENTS

WO    WO03/029939    4/2003

OTHER PUBLICATIONS

A. Klaiber; "The Technology Behind Crusoe Processors Low Power X86-Compatible Processors Implemented With Code Morphing Software"; Jan. 2000; 18 pgs.

(Continued)

*Primary Examiner*—Ponnoreay Pich

(57) ABSTRACT

A system with secure cryptographic capabilities using a hardware specific digital secret.

25 Claims, 6 Drawing Sheets

U.S. PATENT DOCUMENTS

| | | | |
|---|---|---|---|
| 6,292,874 B1 | 9/2001 | Barnett | |
| 6,327,660 B1 | 12/2001 | Patel | |
| 6,363,486 B1 | 3/2002 | Knapton, III | |
| 6,401,208 B2 | 6/2002 | Davis et al. | |
| 6,408,376 B1 | 6/2002 | Ganapathy et al. | |
| 6,415,379 B1 | 7/2002 | Keppel et al. | |
| 6,453,233 B1 | 9/2002 | Kato | |
| 6,457,171 B1 | 9/2002 | Mann et al. | 717/138 |
| 6,507,904 B1 | 1/2003 | Ellison et al. | |
| 6,510,521 B1 | 1/2003 | Albrecht et al. | |
| 6,523,118 B1 | 2/2003 | Buer | |
| 6,581,137 B1 | 6/2003 | Sandorfi | |
| 6,587,949 B1 | 7/2003 | Steinberg | |
| 6,587,979 B1 | 7/2003 | Kraus et al. | |
| 6,598,165 B1* | 7/2003 | Galasso | 713/189 |
| 6,633,963 B1 | 10/2003 | Ellison et al. | |
| 6,675,298 B1 | 1/2004 | Folmsbee | |
| 6,704,872 B1* | 3/2004 | Okada | 713/194 |
| 6,802,006 B1 | 10/2004 | Bodrov | |
| 6,910,094 B1 | 6/2005 | Eslinger et al. | |
| 6,983,374 B2 | 1/2006 | Hashimoto et al. | |
| 6,986,052 B1 | 1/2006 | Mittal | |
| 7,062,769 B1* | 6/2006 | Ma et al. | 719/312 |
| 7,082,615 B1 | 7/2006 | Ellison et al. | |
| 7,096,370 B1* | 8/2006 | Klein | 713/193 |
| 7,185,192 B1 | 2/2007 | Kahn | |
| 7,191,344 B2 | 3/2007 | Lin et al. | |
| 7,225,333 B2 | 5/2007 | Peinado et al. | |
| 7,236,956 B1 | 6/2007 | Ogg et al. | |
| 7,360,097 B2 | 4/2008 | Rothstein | |
| 2001/0019559 A1 | 9/2001 | Handler et al. | |
| 2002/0002654 A1 | 1/2002 | Tomohiro | |
| 2002/0040436 A1 | 4/2002 | Davis et al. | |
| 2002/0107856 A1 | 8/2002 | Scheussler et al. | |
| 2002/0157015 A1 | 10/2002 | Gilbert et al. | |
| 2003/0021417 A1 | 1/2003 | Vasic et al. | |
| 2003/0041221 A1 | 2/2003 | Okada | |
| 2003/0041254 A1 | 2/2003 | Challener et al. | |
| 2003/0056092 A1 | 3/2003 | Edgett et al. | |
| 2003/0061598 A1 | 3/2003 | Karp et al. | |
| 2003/0120745 A1 | 6/2003 | Katagishi et al. | |
| 2003/0126453 A1 | 7/2003 | Glew et al. | |
| 2003/0126454 A1* | 7/2003 | Glew et al. | 713/193 |
| 2003/0142554 A1 | 7/2003 | Green et al. | 365/189.01 |
| 2003/0172265 A1 | 9/2003 | Vu et al. | |
| 2003/0177373 A1* | 9/2003 | Moyer et al. | 713/189 |
| 2003/0182569 A1* | 9/2003 | Matsuzaki et al. | 713/193 |
| 2004/0005061 A1 | 1/2004 | Buer et al. | |
| 2004/0015694 A1 | 1/2004 | DeTreville | |
| 2004/0025036 A1* | 2/2004 | Balard et al. | 713/189 |
| 2004/0039925 A1 | 2/2004 | McMillan et al. | |
| 2004/0098591 A1* | 5/2004 | Fahrny | 713/176 |
| 2004/0107344 A1 | 6/2004 | Minemura et al. | |
| 2004/0243823 A1* | 12/2004 | Moyer et al. | 713/200 |
| 2005/0025091 A1 | 2/2005 | Patel et al. | |
| 2005/0055311 A1 | 3/2005 | Kosaki | |
| 2005/0071651 A1 | 3/2005 | Aguilar et al. | |
| 2005/0180752 A1 | 8/2005 | Nakagawa | |

OTHER PUBLICATIONS

M. Fordhal; "Transmeta Unveils Long-Awaited Next-Generation Pro-Cessor"; Oct. 14, 2003; http://biz.yahoo.com/ap/031014/na_fin_com_us_transmeta_new_chip_2.html; 2 pgs.

Microsoft; "Hardware Platform for the Next-Generation Secure Computing Base"; 2003 Microsoft Corp.; 10 pgs.

Microsoft; "Next-Generation Secure Computing Base, Product Information"; Sep. 8, 2003; http://www.microsoft.com/resources/ngsch/productInfo.mspx: 2 pgs.

Microsoft; "Next-Generation Secure Computing Base, the Road: an Overview"; Apr. 2003 HTTP://www.microsoft.com/resources/NGSCB overview.mspx; 2 pgs.

Microsoft; "Next-Generation Secure Computing Base-Technical FAQ"; Jul. 2003; http//www.microsoft.com/technet/security/news/NGSCB.asp?frame=true; 9 pgs.

Microsoft; "NGSCB: Trusted Computing Base and Software Authentication"; 2003 Microsoft Corp. 16 pgs.

Microsoft; "Press Pass Information for Journalists; at WINHEC, Microsoft Discusses Details of Next Generation Secure Computing Base"; May 7, 2003; http://www.microsoft.com/prespass/features/2003/may03/05-07NGSCB.asp; 4 pgs.

Microsoft; "Press Pass Information for Journalists; Q & A: Delivering on Secure Computing"; Apr. 14, 2006; http://www.microsoft.com/presspass/features/2003/apro03/04-14rsanash.asp; 6 pgs.

Microsoft; "Press Pass Information for Journalists; Q & A: Microsoft Seeks Industry-Wide Collaboration for "Palladium" Initiative"; Jan. 25, 2003; http://www.microsoft.com/presspass/features/jul02/07-01palladium.asp; 4 pgs.

Microsoft; "Press Pass Information for Journalists; The Journey to Trustworthy Computing: Microsoft Execs Report First-Year Progress"; Jan. 15, 2003; http://www.microsoft.com/presspass/features/2003/jan03/01-15twcanniversary.asp; 7 pgs.

Microsoft; "Security Model for the Next-Generation Secure Computing Base"; 2003 Microsoft Corp. 13 pgs.

Microsoft; "The Next-Generation Secure Computing Base: Four Key Features"; Jun. 2003 http//www.microsoft.com/resources/ngsch/four features.mspx; 3 pgs.

Transmeta; "CRUSO-the Technology-the Architecure-Code Morphing Software"; Mar. 14, 2003; http//www.transmeta.com/technology/architecture/code_morphing.html; 3 pgs.

Transmeta; "CRUSO-the Technology-the Architecure-Longrun Power Mangement Technology"; Mar. 14, 2003; http://www.transmeta.com/technology/architecure/longrun.html; 3 pgs.

Final OA Dated Jun. 6, 2007; U.S. Appl. No. 10/334,921.
Final OA Dated Dec. 23, 2008; U.S. Appl. No. 10/334,921.
Non Final OA Dated Feb. 13, 2009; U.S. Appl. No. 10/334,921.
Non Final OA Dated Apr. 5, 2006; U.S. Appl. No. 10/334,921.
Non Final OA Dated May 28, 2008; U.S. Appl. No. 10/334,921.
Non Final OA Dated Oct. 6, 2006; U.S. Appl. No. 10/334,921.
Non Final OA Dated Nov. 26, 2007; U.S. Appl. No. 10/334,921.
Final OA Dated Nov. 23, 2007; U.S. Appl. No. 10/740,939.
Final OA Dated Dec. 9, 2008; U.S. Appl. No. 10/740,939.
Non Final OA Dated Feb. 25, 2009; U.S. Appl. No. 10/740,939.
Non Final OA Dated May 2, 2007; U.S. Appl. No. 10/740,939.
Non Final OA Dated May 28, 2008; U.S. Appl. No. 10/740,939.
Non Final OA Dated Nov. 8, 2006; U.S. Appl. No. 10/740,939.
Non Final OA Dated Mar. 8, 2007; U.S. Appl. No. 10/719,879.
Non Final OA Dated Apr. 14, 2008; U.S. Appl. No. 10/719,879.
Non Final OA Dated Sep. 27, 2007; U.S. Appl. No. 10/719,879.
Notice of Allowance Dated Feb. 9, 2009; U.S. Appl. No. 10/719,879.
Notice of Allowance Dated Sep. 29, 2008; U.S. Appl. No. 10/719,879.
Final OA Dated May 1, 2008; U.S. Appl. No. 10/956,220.
Non Final OA Dated Mar. 18, 2009; U.S. Appl. No. 10/956,220.
Non Final OA Dated Sep. 29, 2008; U.S. Appl. No. 10/956,220.
Non Final OA Dated Nov. 29, 2007; U.S. Appl. No. 10/956,220.
Advisory Action, Mail Date Oct. 20, 2009; U.S. Appl. No. 10/740,939.
Final Office Action, Mail Date Sep. 30, 2009; U.S. Appl. No. 10/956,220.
Final Office Action Mailed Aug. 3, 2009; U.S. Appl. No. 10/334,921.
Notice of Allowance Mailed Jun. 1, 2009; U.S. Appl. No. 10/719,879.
Final Office Action; Mail Date Aug. 14, 2009; U.S. Appl. No. 10/740,939.
Non Final Office Action, Mail Date Oct. 29, 2009; U.S. Appl. No.: 10/334,921.

* cited by examiner

SYSTEM WITH SECURE CRYPTOGRAPHIC CAPABILITIES USING A HARDWARE SPECIFIC DIGITAL SECRET

TECHNICAL FIELD

Embodiments of the present invention relate to the field of digital computer systems. More particularly, embodiments of the present invention relate generally to the employment of a digital secret that is unique to a secure hardware environment for performing cryptography.

BACKGROUND ART

The use of digital computer systems in electronic communications and information processing systems for information control and information retrieval has rapidly proliferated in modern business environments. Preservation of sensitive information under a security implementation utilized by the conventional digital computer systems can be compromised due to unfettered access to the processors and memory of each of the conventional digital computer systems. Thus, it would be advantageous to provide a solution that can provide a secure environment to perform cryptography on sensitive information.

DISCLOSURE OF THE INVENTION

Embodiments of the present invention provide a system that provides a secure environment for employing a key-based cryptographic process using a hardware specific secret identifier.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Figure 1:
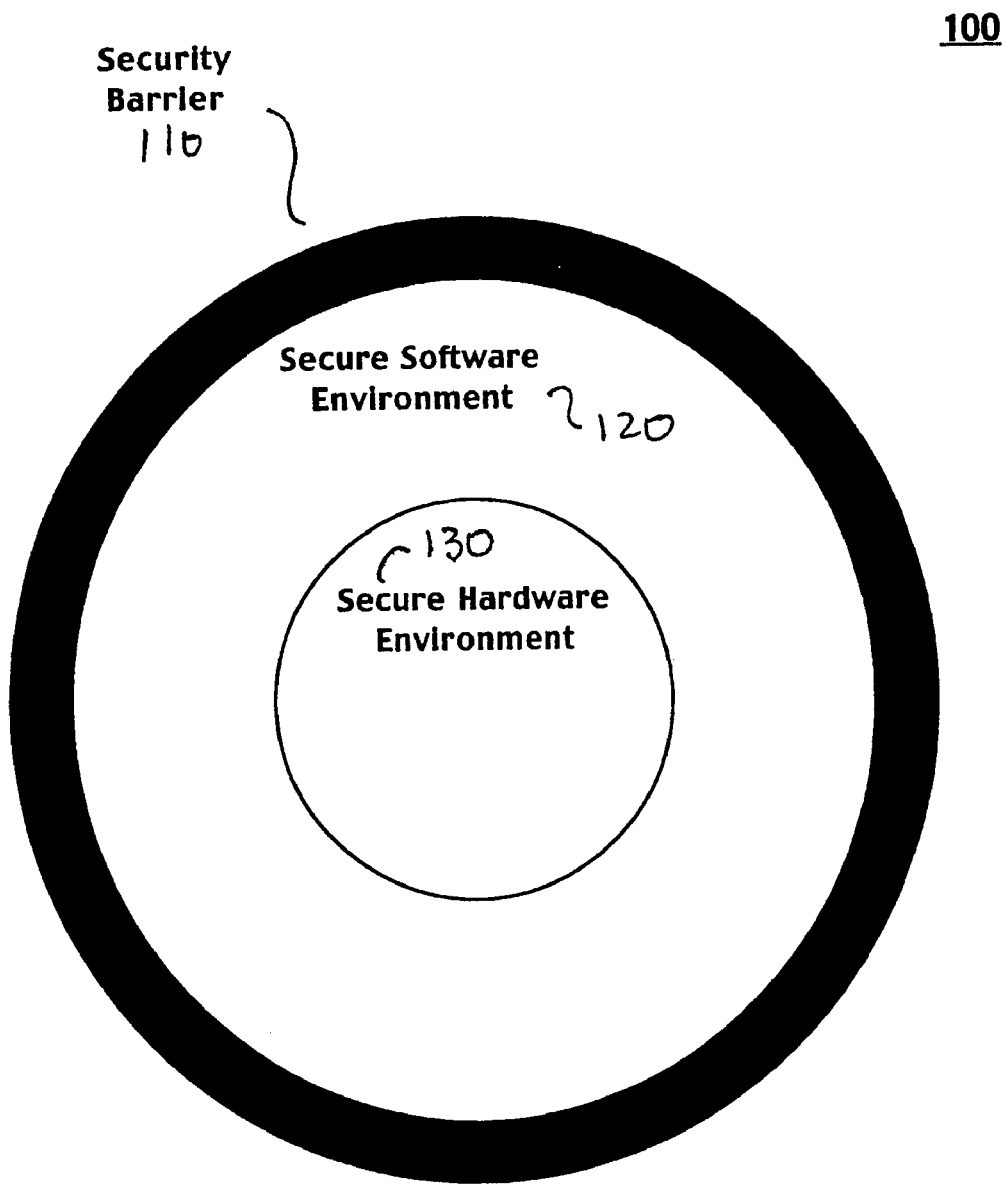
FIG. 1 is a diagram illustrating a secure environment in which to store a secure identifier, in accordance with one embodiment of the present invention.

Reference will now be made in detail to the preferred embodiments of the present invention, a system for a processor with secure cryptographic capabilities using a hardware specific digital secret, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "creating," "protecting," "setting," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a system for the creation of a processor environment within which secure cryptography is performed using an internally stored hardware specific digital secret. Embodiments of the present invention and their benefits are further described below.

Referring now to FIG. 1, a diagram illustrating a general purpose processing environment 100 with secure cryptographic capabilities using a hardware specific digital secret is shown in FIG. 1, in accordance with one embodiment of the present invention. The processing environment 100 comprises a security barrier 110 that encloses a secure software environment 120 and a secure hardware environment 130. That is, the processing environment, and more particularly, the secure hardware environment 130, is secure from outside encroachment. The secure software environment 120 is coupled to the secure hardware environment 130.

The secure hardware environment 130 provides for core processing functionality that is hard coded onto an integrated circuit (IC) chip. The core processing functionality by itself does not provide complete processing functionality; however, in combination, both the secure hardware environment 130 and the secure software environment 120 provide for complete processing functionality in a processing environment. As such, the software environment provides its own processing functionality that may or may not be duplicated by the secure hardware environment 130. In addition the secure software environment 120 provides an interface for providing restricted remote access to the secure hardware environment 130.

The combination of the hardware environment and the software environment provide for flexible processing capabilities. In one implementation, the hardware environment and supporting software environment can be configured to implement any processor functionality. For example, in one embodiment, the processor environment is substantially similar to an x86 central processing unit (CPU), or its derivatives. In this way, applications, legacy or otherwise, that are supported by the x86 CPU can be supported by the processing environment created by the combination of the secure hardware environment 130 and the secure software environment 120. Other embodiments are well suited to implementing other CPU processor functionalities other than provided by the x86 processor.

Because of the interrelationship of the secure software environment 120 and the secure hardware environment 130, modifications to the processing environment can be quickly implemented in the software environment without any modification to the hardware environment. As such, bugs or errors in the processing environment can be quickly resolved and repaired. Additionally, updated and new features to the processing environment can be quickly added by making the necessary modification to the software environment.

In addition, the secure hardware environment is only accessible through the secure software environment. The secure software environment provides for executable instructions, which are sent to the secure hardware environment for processing. Because the secure software environment provides for a filtering function, remote access to the secure hardware environment 130 can be partially restricted, or fully restricted. In the present embodiment, remote access to the hardware environment that is direct is fully restricted by the software environment 120. As such, all access to the secure hardware environment 130 must go through the secure software environment 120.

Additionally, the secure software environment is configured to provide additional security against remote access. The secure environment 100 is created because the secure software environment 120 creates a security barrier 110 to restrict remote access into the secure software environment. Correspondingly, remote access is restricted into the secure hardware environment 120.

Figure 2:
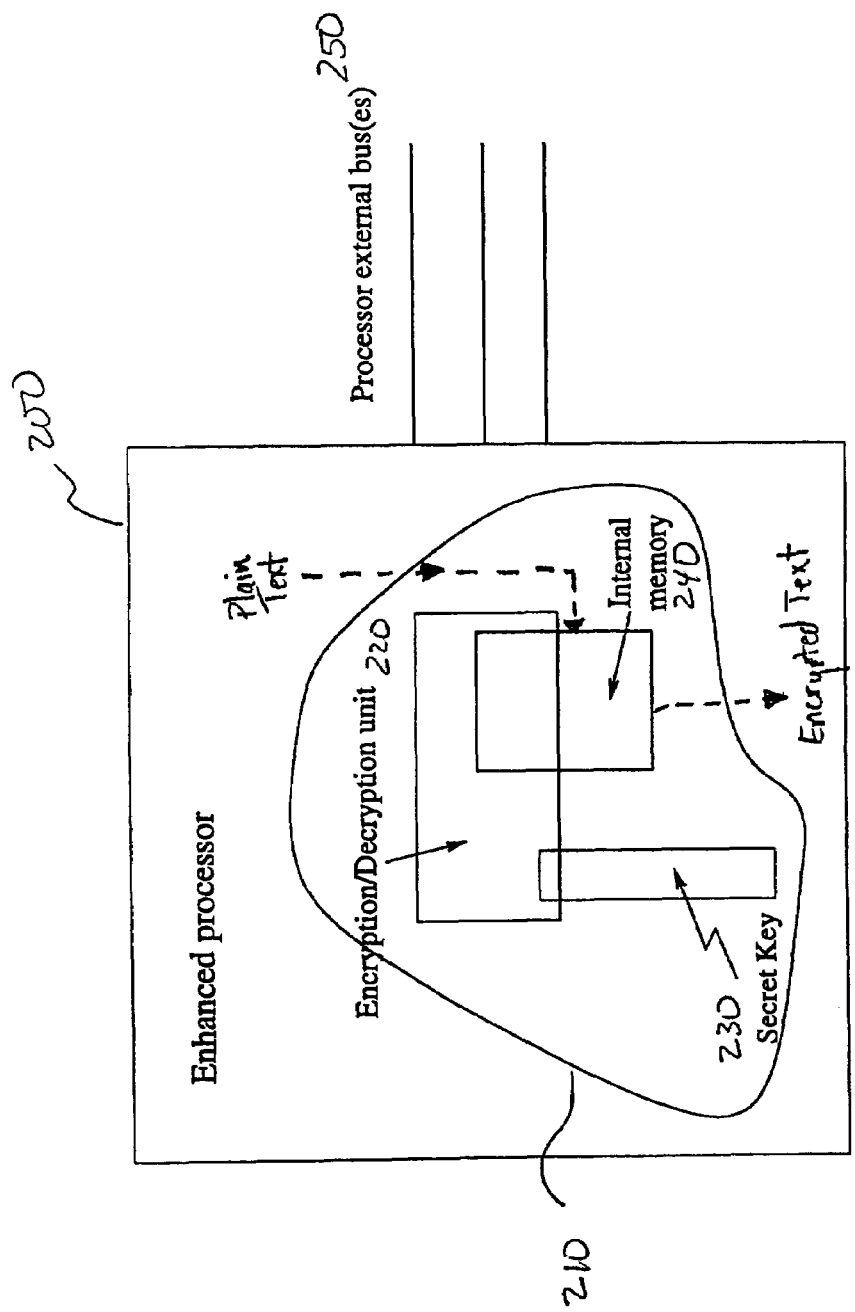
FIG. 2 is a block diagram illustrating a processor environment with secure cryptography capabilities using a secure hardware specific digital secret, in accordance with one embodiment of the present invention.

Referring now to FIG. 2, a block diagram is shown illustrating a processor 200 with secure cryptographic capabilities, in accordance with one embodiment of the present invention. That is, the processor 200 is enhanced with secure cryptographic capabilities.

The enhanced processor 200 comprises a self contained device 210 that provides cryptographic capabilities internally for the enhanced processor 200. The enhanced processor 200 comprises an encryption/decryption unit 220, or cryptography engine 220, a secret key 230 or digital secret 230, and internal memory 240. In one embodiment a cryptography device 210 within the processor 200 provides the cryptographic capabilities by incorporating the functionalities of the cryptography engine 220, the secret key 230 and the internal memory 240.

The cryptography engine 220 performs a key-based cryptographic process on data within the processor 200. In one embodiment, the key-based cryptographic process comprises a key-based encryption process, and in another embodiment, the key-based cryptographic process comprises a key-based decryption process.

In one embodiment, the cryptography engine 220 implements a cryptography mechanism that comprises the Federal Data Encryption Standard (DES) that specifies a cryptographic process that is used for the cryptographic protection of digital data.

While embodiments of the present invention are disclosed using the DES cryptography mechanism, other embodiments are well suited to using any cryptography mechanism, such as, the Triple Data Encryption Algorithm (TDEA or Triple DES), the Advanced Encryption Standard (AES), etc. These various standards define the mathematical steps required to transform data into a cryptographic cipher, and also to transform the cipher back to its original form.

The secret key 230 comprises a hardware specific digital secret that is used in the key-based cryptographic process implemented by the cryptography engine 220. The secret key 230 is coupled to the cryptography engine 220. The secret key 230 is internally accessible only within the processor 200. That is, the secret key is securely confined within the processor 200. More specifically, in one embodiment, the secret key 230 is internally accessible by the cryptography engine 220.

The internal memory 240 supports the key-based cryptographic process. The internal memory is coupled to the cryptography engine 220. For instance, the internal memory stores data created and used in the cryptographic process, and microcode for coordinating the cryptographic process within the device 210 of the processor 200. For security purposes, in one embodiment, the internal memory is dedicated to the device 210 for cryptography purposes. As such, intermediate data created in the cryptographic process is not exposed outside of the device 210, and the processor 200.

For example, the internal memory 240 comprises a register file or memory array within the processor 200. The internal memory is devoted to the task of storing intermediate results for the purpose of completing the cryptography process.

The size of the private data array of the internal memory 240 is required to be at least as large as the block size associated with the cipher block of data, in one embodiment of the present invention. As such, the internal memory also includes a minimum of sufficient space to accommodate any data or information used to propagate information from earlier block encryptions and later block encryptions in order to support the targeted cipher mode in use. In this way, during the encryption of multiple blocks of data, the processor 200 need not expose intermediate results outside of the processor 200 by storing data externally to the processor 200.

The device 210 combines the cryptography engine 220, the secret key 230, and the internal memory 240 completely within the processor 200 to take a suitably sized plain-text object, encrypt it into cipher-text using the encryption hardware of the device 210. The encryption engine 220 uses the processor specific secret key 230 in the key-based cryptography process implemented by the cryptography engine 220. As shown in FIG. 2, plain text is provided as an input into the device 210, and encrypted text is produced as an output from the device 210. The device 210 operates in such a way that no intermediate result passes outside the hardware of the device 210 and the processor 200.

Parallel functionality to decrypt the cipher text back to plain text is also provided using the cryptography engine 220 in conjunction with the secret key 230. This is necessary since it is frequently desirable to discard the plain text once it has been encrypted.

A significant benefit of embodiments of the present invention is that the device 210 is self-contained in a single processor chip, and does not require additional peripheral devices. As a result, snooping devices used to connect to the processor 200 via one or more external buses 250 are blocked from discovering the secret key 230 during the cryptography process.

Figure 3:
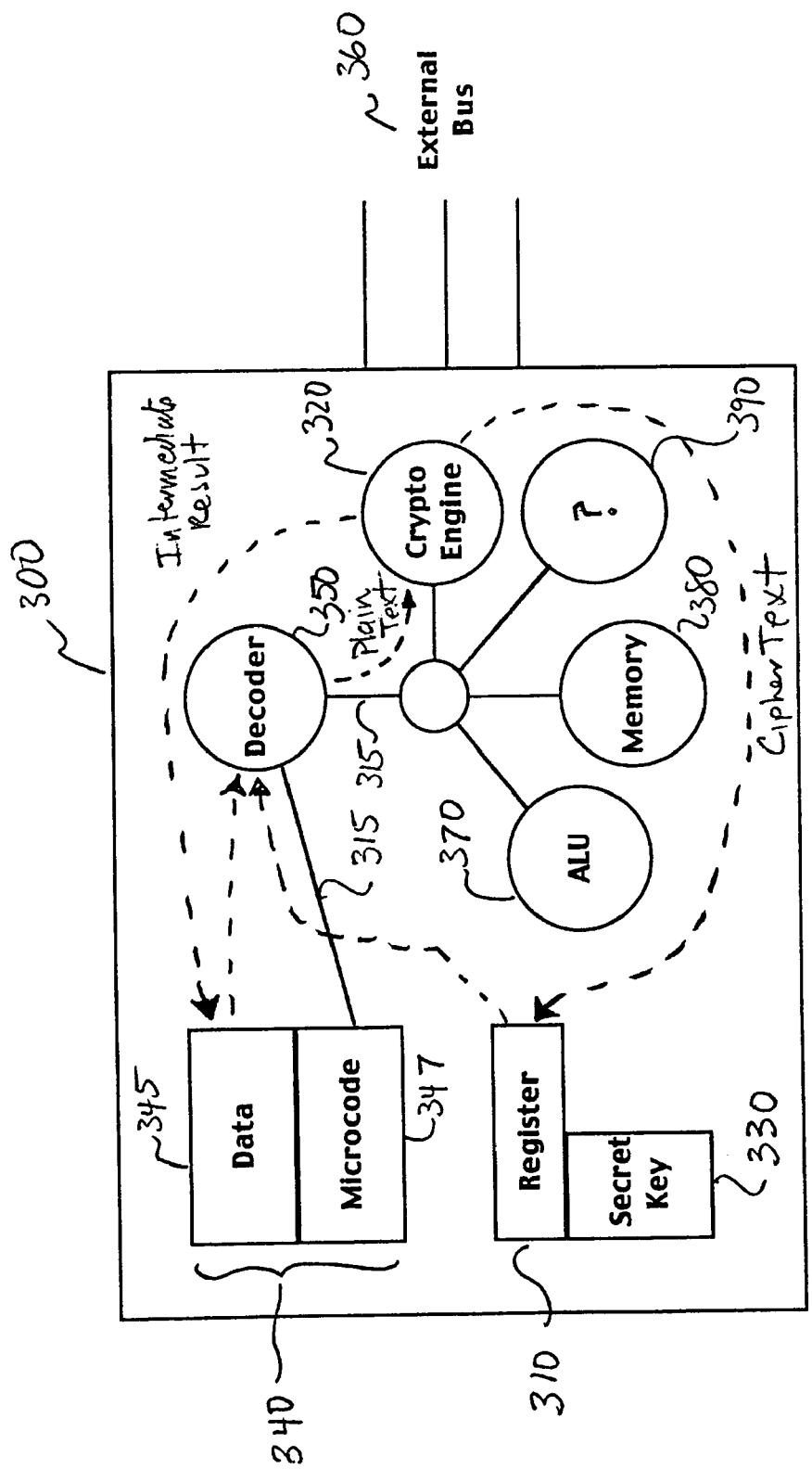
FIG. 3 is a flow diagram illustrating the cryptography process in a processor environment with secure cryptography capabilities including separate cryptographic functional blocks communicating through an internal bus, in accordance with one embodiment of the present invention.

FIG. 3 is a data flow diagram illustrating the cryptographic process in a processor 300 with secure cryptographic capabilities, in accordance with one embodiment of the present invention. In the processor 300, the cryptographic capability is performed by multiple components that are interconnected with an internal bus 315. The bus 315 is internal to the processor 300 and does not expose communication outside of the processor 300. That is, the internal bus facilitates secure communication between the components within the processor 300.

In one embodiment, the processor 300 is a very long instruction word (VLIW) processor that comprises a decoder 350. The decoder 350 generally decodes coded data back to its original form, or to a form supported by the functional blocks in the VLIW processor. For example, the functional blocks in the processor 300 include the cryptographic engine 320 ("crypto" engine 320), the arithmetic logic unit (ALU) 370, the memory unit 380, and other functional units 390.

The processor 300 also comprises an internal memory 340 that supports the cryptographic process performed by the cryptography engine 320. The internal memory 340 comprises a data block 345, and a microcode block 347. The data block 345 comprises data that is used in the cryptographic process. For example, the data block 435 may contain the original plain text data upon which cryptography is to be performed. In addition, the data block 435 may contain intermediate results created in the cryptographic process implemented by the cryptography engine 320. In this way, the intermediate results are not exposed outside the processor 300 via the external buses 360.

The microcode block 347 contains the instructions needed to coordinate the cryptographic process implemented throughout the processor 300. For instance, the microcode block 347 contains the step-by-step instructions needed to take the plain text in the data block 345, send it to the decoder 350 so that the crypto engine 320 can receive the plain text and perform an encryption process, and then output cipher text which is stored in the register 310. While the present embodiment is of a processor that makes extensive use of microcode, the equivalent functionality can be implemented in other embodiments in other processor architectures using dedicated transistors.

A secret key 330 is stored within the register memory 310. The secret key 330 as described previously, is a hardware specific secure identifier that is used in the key-based encryption process implemented by the cryptography engine 320.

Figure 4:
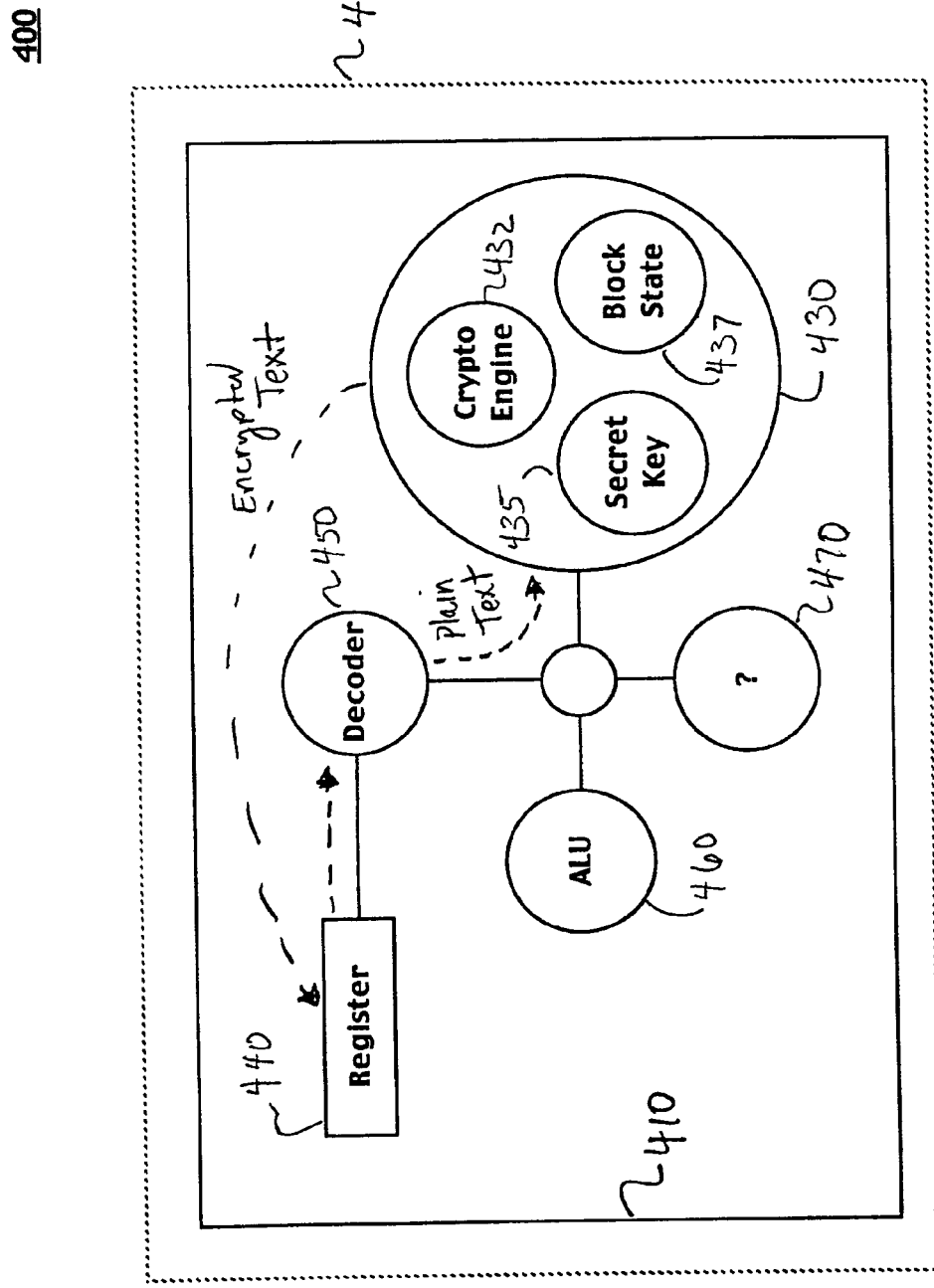
FIG. 4 is a diagram illustrating the cryptography process in a processor environment with secure cryptographic capabilities including an integrated cryptographic functional block, in accordance with one embodiment of the present invention.

FIG. 4 is a data flow diagram illustrating the cryptographic process in a processor 400 with secure cryptographic capabilities, in accordance with one embodiment of the present invention. In the processor 400, the cryptographic capability is performed within a single functional block 430.

The processor 400 comprises a secure hardware environment 410 providing core processing functionality. In addition, the processor 400 comprises a secure software environment 420 that is coupled to the secure hardware environment 410. The secure software environment 420 generates executable instructions that are sent to the secure hardware environment 410 for processing. As a result, the secure hardware environment 410 in combination with the secure software environment 420 provides processor capability. In addition, the secure hardware environment 410 is accessible only through the secure software environment 420. In one embodiment, the processor 400 is a general purpose central processing unit (CPU) which performs the equivalent functionality of an x86 CPU.

The secure hardware environment 400 comprises a memory register 440, a decoder 450, and plurality of functional units. For example, the functional units comprise the ALU 460 unit, the cryptography unit 430, and other functional units 470. The memory register 440 supports the cryptography process. In one embodiment, by storing data in the register 440 and providing the proper instruction, the cryptography process is initiated through the hardware environment 410 via the cryptography unit.

The cryptography unit 430 comprises a functional unit within the processor for securely executing a key-based cryptographic process autonomously within the cryptography unit, and internally within the processor 410. The cryptography unit 430 comprises a cryptography engine 432, a secret key 435, or digital secret 435, and a block state memory 437.

In the present embodiment, a full hardware DES encryption engine is capable of performing triple DES in a number of modes (ECB, CBC, etc.) on data held within the processor 400 itself or on data captured within the processor 400. While the present embodiment implements triple DES cryptography mechanism, other embodiments are well suited to using other cryptography mechanisms, such as, AES.

The secret key 435 is unique to the processor 400, and is permanently and physically manifested within the secure hardware environment 410, and more specifically, within the cryptography unit 430. As stated previously with regards to FIG. 3, the secret key 430 is used in the key-based cryptographic process implemented within the cryptography engine 432. In addition, the secret key 430 is only accessible by the cryptography engine 432 within the cryptography unit 430.

In addition, the cryptography unit 430 comprises a block state memory 437 that is coupled to the cryptography engine 432. The block state memory 437 is used for state tracking in the cryptography process implemented within the cryptography unit 430.

The cryptography unit 430 comprises a fully integrated circuit within the secure hardware environment 410. As such, the device implementing the cryptography process is in software-impermeable silicon; the cryptography unit. In this way, communication within the cryptography unit 430 is performed without the use of an obvious bus, and is less prone to attacks via bus snooping and, significantly, immune from attack via malicious modification of the microcode loaded into the CPU. For instance, the digital secret 435 and the block state memory 437 (internal memory) are fully integrated with the cryptography engine 432 within the cryptography unit 430. As such, the digital secret 435, internal memory 437, and cryptography engine 432 are hardwired together as one functional unit to facilitate communication without requiring a bus. As such, in an cryptography instruction, the cryptography engine 432 can use its own secret key 435, or another key that is provided.

In the present embodiment, a secret key 435 is stored in the secure hardware environment 410. More particularly, the secret key 435 comprises a comprises a digital secret that is unique identifier of the processor 400. As such, no two similarly configured secure hardware environments can have the same secret key 435.

The present embodiment uses the secret key 435 to prime the cryptography engine 432 without referencing code or data outside the cryptography unit 430. As a result, this eliminates the possibility of external bus-snooping attacks on the secret key 435 each time it is used, and is not susceptible to a malicious microcode attack.

In one embodiment, the secret key 435 is permanently and physically manifested in the secure hardware environment 410. Additionally, the secret key is known and used only within the confines of the cryptography unit 430. In other words, the secret key 435 cannot be transferred through any communication bus outside of cryptography unit 430.

In one embodiment, the secret key 435 is a random number. Generation of the random number can be through any means. In one embodiment, generation of the random number is associated with the manufacturing process of the processor die (IC chip) containing the secure hardware environment 410, as will be further described more fully later.

Figure 5:
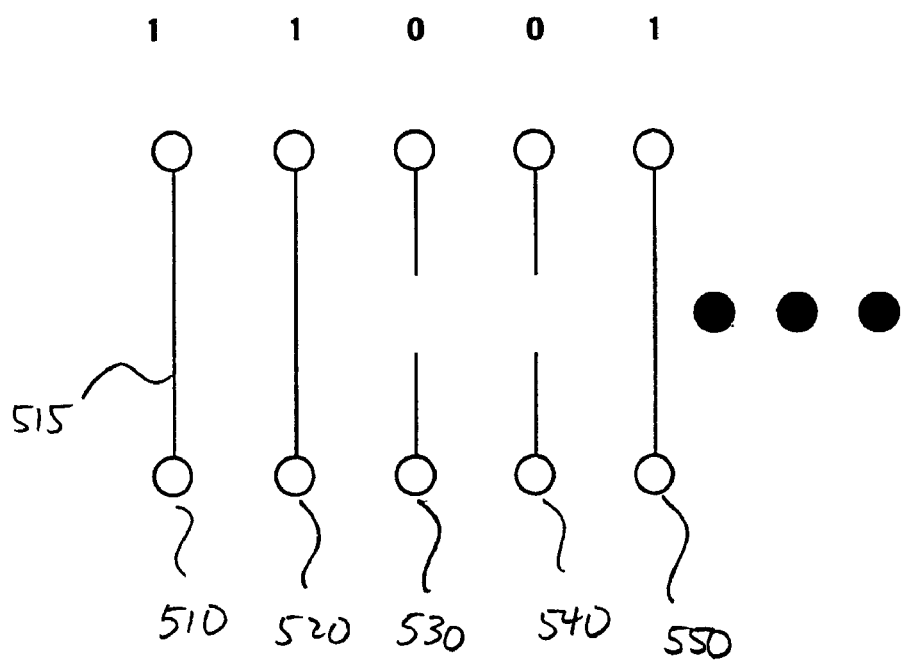
FIG. 5 is a diagram illustrating a plurality of fusible links that comprise a secure hardware specific digital secret, in accordance with one embodiment of the present invention.

FIG. 5 is a diagram illustrating the plurality of fusible links 500 that comprises the random number of the secret key (e.g., secret key 435), in accordance with one embodiment of the present invention. The random number is manifested within the secure hardware environment 410 through a plurality of fusible links 500 coupled to and contained within the secure hardware environment 410.

The logic of the secret key as implemented within the plurality of fusible links 500 is not externally scannable. Also, the secret key is not visible in an direct way to an x86 program running on the processor, for example. That is, the secret key never is exposed outside the processor containing the secret key.

By way of example, the random number is manifested by permanently setting a binary state in each of the plurality of fusible links 500. As such, each of the plurality of fusible links 500 stores one bit of information. Taken as a whole, the states of each of the plurality of fusible links comprise the random number of the secret key. In exemplary FIG. 5, the plurality of fusible links is comprised of the following fusible links: 510, 520, 530, 540, 550, etc. As such, the plurality of fusible links represents a binary representation of the secret key. To illustrate, the random number in FIG. 5 is 11001 . . . , as represented in a binary numbering system.

The secret key is a random number of sufficient length to avoid discovery by brute-force attack. In one embodiment the random number comprises 128 bits. As such, the plurality of fusible links 500 comprises 128 fusible links to comprise the random number of the secret key. While the present embodiment presents the secret key that comprises 128 bits, other embodiments are well suited to random numbers comprising more than 128 bits, or less than 128 bits.

The binary states in the plurality of fusible links are established by completing a circuit path through the fusible link or destroying a circuit path through the fusible link. Fusible link 510 illustrates the completion of a circuit path. In one implementation, a fusible link that completes a circuit path through the fusible link as coupled to other circuit elements creates a logic high level (1). Correspondingly, a fusible link that does not complete a circuit path through the fusible link as coupled to other circuit elements creates a logic low level. As such, fusible link 510 is a logic high. In addition, fusible link 520 and fusible link 550 are also logic highs. Correspondingly, fusible link 530 and fusible link 540 are logic low levels (0), as the circuit path through those links are broken.

In one embodiment, each of the states contained within the plurality of fusible links 500 is read through a scan chain implementation. As such, the random number as represented by the states of the plurality of fusible links can be utilized by the cryptography unit implementing the cryptography capabilities of a processor.

Although the present embodiment discloses the permanent storage of the random number representing the secret key through a plurality of fusible links, other embodiments are well suited to other means for permanently storing the random number within the secure hardware environment that contains the secret key.

Although the present embodiment discloses accessing the random number that is permanently stored in the plurality of fusible links 500 through a scan chain, other embodiments are well suited to accessing the random number through other means, such as, internal registers.

In one embodiment, the random number used for the secret key is generated from testing data created during the chip manufacturing process to discover a naturally occurring random number. The random number and the testing data are unique to the specific die containing the secure hardware environment and the wafer that includes the specific die, in accordance with one embodiment of the present invention.

By using chip manufacturing testing data, the present embodiment is able to generate a random number that is specific to a particular die during its fabrication. As a result, the random number can also naturally be physically manifested within or embedded into the die during the fabrication process. For example, the random number can be created by engaging or disengaging links in a plurality of fusible links located within the secure hardware environment, as described previously in full, in conjunction with performing repair to the specific die.

Figure 6:
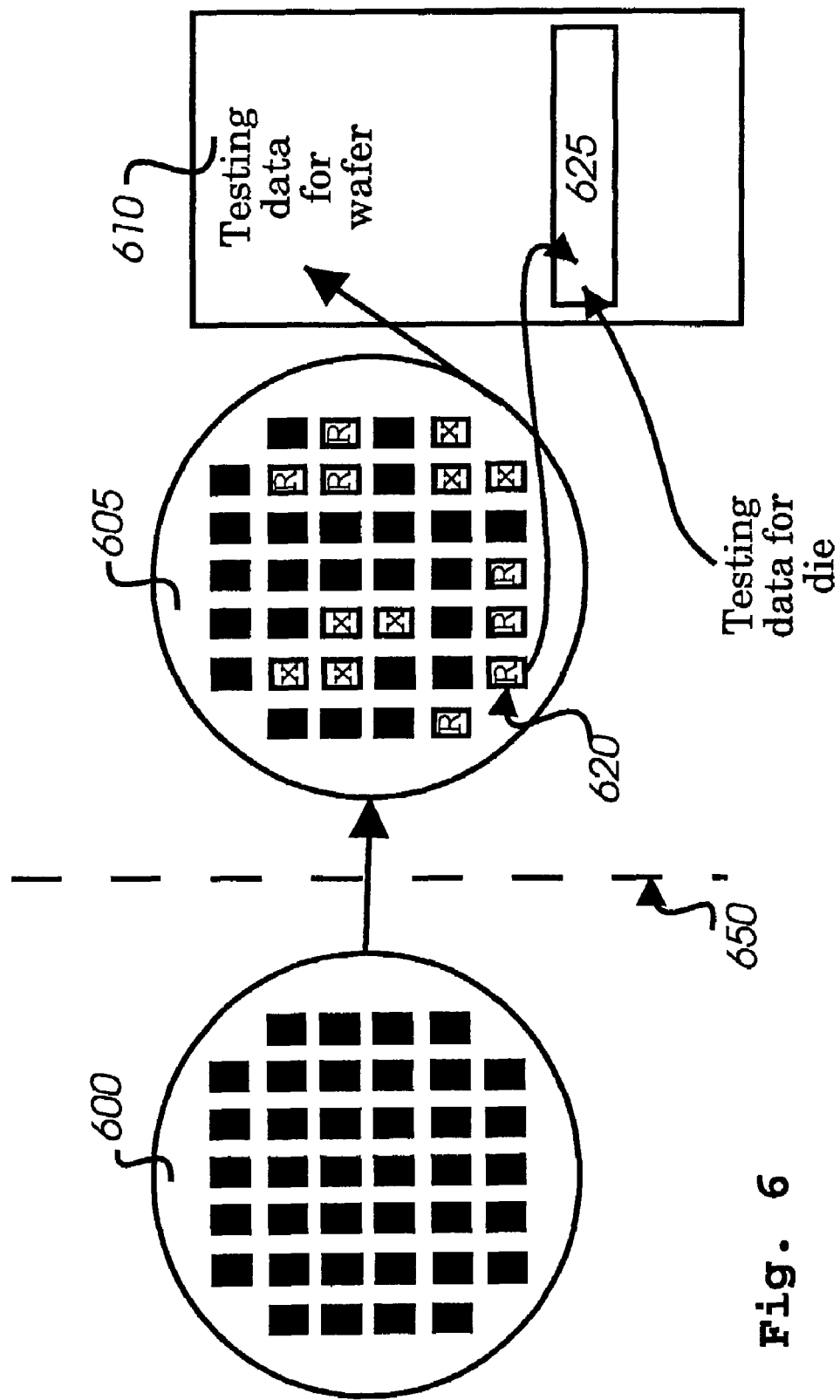
FIG. 6 is a diagram illustrating components taken from a chip manufacturing process used for generating a random number for use as a secure hardware specific digital secret, in accordance with one embodiment of the present invention.

FIG. 6 is a diagram illustrating the components of testing data for a silicon wafer generated during fabrication, in accordance with the present embodiment. In FIG. 6, a silicon wafer 600 is shown from which a plurality of dice or chips are created during a fabrication process. In the silicon wafer 600, each of the darkened blocks represents a single die that after fabrication can be partitioned out and used as a hardware processing unit.

To the left of dotted line 650 is shown the fabrication of the plurality of dice in the silicon wafer 600. To the right of dotted line 650 is shown the testing process for the silicon wafer 600 and for each of the plurality of dice located on the silicon wafer 600.

During the testing process, various tests are implemented to determine the performance characteristics of each of the plurality of dice on the silicon wafer 500. In its most simplest categorization, the testing process may categorize each of the plurality of dice into three categories: acceptable (darkened), unacceptable (X), and repairable (R).

Specifically, to the right of line 650, the silicon wafer 600 undergoes the testing process. After the silicon wafer 600 is tested, a resulting test pattern 605 for the silicon wafer 600 is generated. In the test pattern 605, a darkened block illustrates a die that fits within the acceptable category. In the test pattern 605, a block with an "X" illustrates a die that fits within the unacceptable category. Also, in the test pattern 605, a block with an "R" illustrates a die that fits within the repairable category. The letter designations "X" and "R," as well as the darkened block are for illustration purposes only.

During the testing process, data concerning the wafer is acquired which includes wafer data 610 that is generated for the silicon wafer 600 in general and data specific to each die present on the wafer. This wafer data 610 can include information regarding the pattern of dice that fit within the acceptable, unacceptable, and repairable categories. For example, due to the chemical interactions of the silicon wafer 600 during the fabrication process, clusters of dice fitting within a particular category may predominate. As shown in FIG. 6, groups of unacceptable dice marked with an "X" may be clustered together. Similarly, groups of repairable dice marked with an "R" may be clustered together.

As such, the wafer data 610 for the silicon wafer 600 can indicate the pattern of acceptable, unacceptable, and repairable dice located on the silicon wafer 600. The wafer data also includes detailed test-vector results for each independent die, which can be used to help determine the quality of the die and the manner in which any needed repair of that die may be performed. The wafer data 610 can be stored in a file. Due to the random nature of the fabrication process, the contents of the file containing the wafer data 610 is unique to the silicon wafer 600. The wafer data 610 is a unique, and naturally occurring random number for the silicon wafer 600. In fact, for each silicon wafer that undergoes fabrication, a file containing corresponding wafer data can be generated that is unique to that silicon wafer.

A hash or message digest of the wafer data 610 can be created using any suitable, cryptographically strong, hash algorithm. For example, SHA-1 or MD5. For purposes of this Specification, the symbol "XXX" can represent the message digest of wafer data corresponding to a particular wafer, computed with the selected hash algorithm, H( ). By way of illustration the message digest of wafer data 610 corresponding to silicon wafer 600 can be represented by the symbol $XXX_{610}$=H(data 610). Without access to the wafer data file, it is impractically hard to guess the numerical value of $XXX_{610}$. Thus, it will be recognized that $XXX_{610}$ can be considered a secret unique to the wafer 600.

For a particular die on the silicon wafer 600, the die-specific data includes x and y coordinates to indicate the location of the particular die on the wafer and also includes repair information for that particular die. As an example, die 620 fits within the repairable category. As a result, the die data 625 for the die 620 will include the x and y coordinates for the die 620 as well as repair information for the die 620. This die data 625 is a subcomponent of the wafer data 610.

For each of the plurality of dice in the silicon wafer 600, a corresponding die data can be created that is unique. Uniqueness is preserved because the x and y coordinates are different for each of the plurality of dice, even though repair information may be the same, such as, in the case when multiple dice have no repair information.

A hash or message digest of the die data 625 can be created using any suitable hash algorithm Ho, as described previously. For purposes of this Specification, the symbol "YYY" can represent the message digest of the die data for a particular die. By way of illustration, the message digest of the die data 625 for die 620 is represented by the symbol $YYY_{625}$=H (data 625). The uniqueness and not the secrecy of YYY is all that is required of this computed value.

For each of the plurality of dice in the silicon wafer 600, an HMAC algorithm keyed with the wafer secret (XXX) can be used to convert the die-unique hash (YYY) into a secret for that die, in one embodiment. The secret for a die will be represented by the symbol $K_D$. That is, in Equation 1:

$$K_D = HMAC_{XXX}(YYY) \quad (1)$$
$$= H(XXX|H(XXX|YYY|\text{padding})|\text{padding}).$$

The padding characters are included to align intermediate data to the block size of the selected hash algorithm. By way of illustration, the random number for die 620, represented as $K_{620}$, is created as follows in Equations 2 and 3:

$$R_{620}=H(XXX_{610}|YYY_{625}|\text{padding}); \text{ and} \quad (2)$$

$$K_{620}=H(XXX_{610}|R_{620}|\text{padding}). \quad (3)$$

Here, an intermediate result $R_{620}$ is introduced, which is helpful only in clarifying the steps needed to compute the result, $K_{620}$.

Embodiments of the present invention can be implemented partly on software running on a computer system. The computer system can be a personal computer, notebook computer, server computer, mainframe, networked computer, handheld computer, personal digital assistant, workstation, and the like. This software program is operable for manipulating a hardware specific digital secret for cryptography purposes. In one embodiment, the computer system includes a processor coupled to a bus and memory storage coupled to the bus. The memory storage can be volatile or non-volatile and can include removable storage media. The computer can also include a display, provision for data input and output, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Embodiments of the present invention, a system for a processor with secure cryptographic capabilities using a hardware specific secret identifier, is thus described. While the present invention has been described in particular embodiments, it should be appreciated that the present invention should not be construed as limited by such embodiments, but rather construed according to the below claims.

What is claimed is:

1. A processor, comprising:
    a digital secret including a secret key used in a key-based cryptographic process, wherein the digital secret is stored within the processor, wherein the processor is configured to use the digital secret for both encryption and decryption, wherein the digital secret is calculated using an HMAC algorithm implemented on testing data, and wherein the testing data is associated with fabrication of the processor;
    a cryptography engine configured to perform the key-based cryptographic process internally within the processor using the digital secret; and
    internal memory configured to store data associated with the key-based cryptographic process, wherein the data includes at least one result of a calculation performed by the key-based cryptographic process.

2. The processor of claim 1 further comprising an internal bus configured to facilitate secure communication between the cryptography engine, the digital secret, and the internal memory within said processor.

3. The processor of claim 1, wherein the digital secret is securely confined within the processor.

4. The processor of claim 1, wherein the internal memory includes microcode for implementing the key-based cryptographic process on the data within the processor, and wherein the internal memory is configured to perform state tracking associated with the key-based cryptographic process.

5. The processor of claim 1, wherein the data includes intermediate data generated by the key-based cryptographic process.

6. The processor of claim 1 further comprising:
a cryptography unit including a functional unit within the processor for securely executing the key-based cryptographic process internally within the processor, wherein the cryptography unit includes:
the digital secret;
the cryptography engine; and
the internal memory.

7. The processor of claim 1, wherein the key-based cryptographic process includes:
a key-based encryption process; and
a key-based decryption process.

8. The processor of claim 1, wherein the processor includes:
a secure hardware environment configured to provide core processing functionality; and
a secure software environment coupled to the secure hardware environment, wherein the secure software environment is configured to generate executable instructions that are sent to the secure hardware environment for processing, wherein the secure hardware environment in combination with the secure software environment is configured to provide processor capability, and wherein the secure hardware environment is accessible through the secure software environment.

9. The processor of claim 1, wherein the digital secret is unique to the processor and is permanently and physically manifested within the processor.

10. A processor, comprising:
a secure cryptography unit, wherein the secure cryptography unit is configured to internally provide secure cryptographic capabilities as a functional unit within the processor, the secure cryptography unit including:
a cryptography engine configured to perform a key-based cryptographic process;
a digital secret accessible to the cryptography engine, wherein the digital secret includes a secret key used in the key-based cryptographic process, wherein the processor is configured to use the secret key for both encryption and decryption, wherein the digital secret is calculated using an HMAC algorithm implemented on testing data, and wherein the testing data is associated with fabrication of the processor; and
internal memory configured to store data associated with the key-based cryptographic process, wherein the data includes at least one result of a calculation performed by the key-based cryptographic process.

11. The processor of claim 10, wherein the key-based cryptographic process includes:
a key-based encryption process; and
a key-based decryption process.

12. The processor of claim 10, wherein the processor is a very long instruction word (VLIW) processor.

13. The processor of claim 10, wherein the processor includes:
a secure hardware environment providing core processing functionality; and
a secure software environment coupled to the secure hardware environment, wherein the secure software environment is configured to generate executable instructions that are sent to the secure hardware environment for processing, wherein the secure hardware environment in combination with the secure software environment is configured to provide processor capability, and wherein the secure hardware environment is accessible through the secure software environment.

14. The processor of claim 10, wherein the digital secret is unique to the processor and is permanently and physically manifested within the processor.

15. The processor of claim 10, wherein the digital secret includes:
a plurality of fusible links configured to manifest the digital secret by permanently setting a binary state in each of the plurality of fusible links.

16. The processor of claim 10, wherein the testing data includes:
wafer test data; and
die test data.

17. The processor of claim 10, wherein the secure cryptography unit is a fully integrated circuit within the processor.

18. The processor claim 10, wherein the digital secret and the internal memory are fully integrated with the cryptography engine to facilitate communication without use of a bus.

19. The processor of claim 10, wherein the key-based cryptography process includes a Triple Data Encryption Algorithm (TDEA or Triple DES) cryptography process.

20. A processor, comprising:
a secure hardware environment configured to provide core processing functionality, wherein the secure hardware environment includes:
a secure cryptography unit configured to provide secure cryptographic capabilities as a functional unit within the secure hardware environment, wherein the secure cryptography unit is configured to facilitate performance of a key-based cryptographic process performed by the processor, wherein the key-based cryptographic process includes encryption using a digital secret and decryption using the digital secret, wherein the digital secret is calculated using an HMAC algorithm implemented on testing data, wherein the testing data is associated with fabrication of the processor, wherein the key-based cryptographic process further includes generating data, wherein the data includes at least one result of a calculation performed by the key-based cryptographic process.

21. The processor of claim 20 further comprising:
a secure software environment configured to access the secure hardware environment, wherein the secure software environment is configured to generate executable instructions that are sent to the secure hardware environment for processing, wherein the secure hardware environment in combination with the secure software environment is configured to provide processor capability.

22. The processor of claim 20, wherein the secure cryptography unit includes:
a cryptography engine configured to perform the key-based cryptographic process;
the digital secret accessible to the cryptography engine, wherein the digital secret includes a secret key used in the key-based cryptographic process; and internal memory coupled to the cryptography engine, wherein the internal memory is configured to support the key-based cryptographic process and further configured to perform state tracking associated with the key-based cryptographic process.

23. The processor of claim 22, wherein the internal memory is configured to securely store the data, and wherein the data includes intermediate data generated by the key-based cryptographic process.

24. The processor of claim 22, wherein the secure cryptography unit is a fully integrated circuit within the processor, and wherein the secure cryptography unit is configured to facilitate communication between the cryptography engine, the digital secret and the internal memory without use of a bus.

25. The processor of claim 20, wherein the secure cryptography unit is a fully integrated circuit within the processor.

* * * * *